H. R. HUGHES.
ROTARY BORING DRILL.
APPLICATION FILED MAR. 22, 1917.
1,245,462.
Patented Nov. 6, 1917.
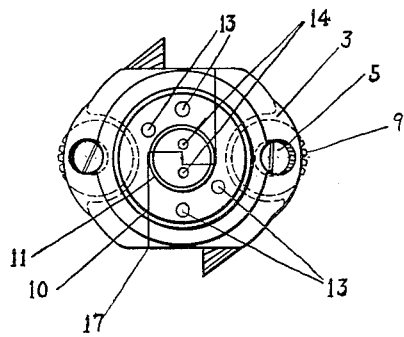
Fig. 1
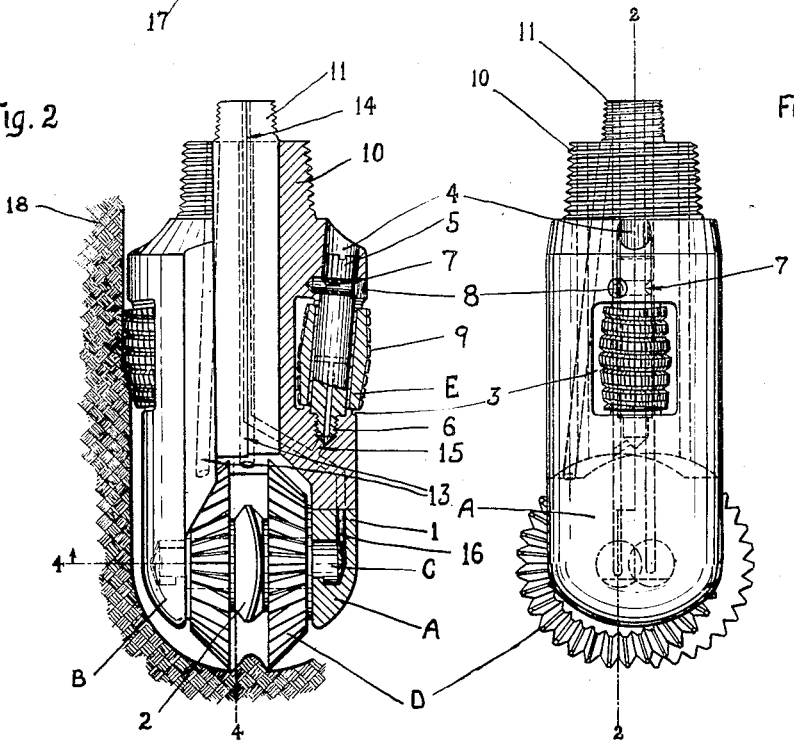
Fig. 2
Fig. 3
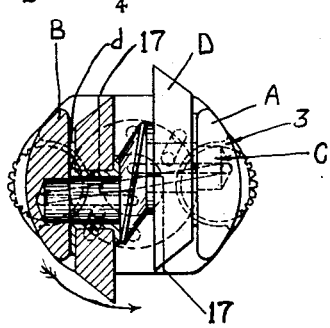
Fig. 4
Howard R. Hughes, Inventor
By his attorney Jesse R. Stone

UNITED STATES PATENT OFFICE.

HOWARD R. HUGHES, OF HOUSTON, TEXAS, ASSIGNOR TO HUGHES TOOL COMPANY, OF HOUSTON, TEXAS, A CORPORATION OF TEXAS.

ROTARY BORING-DRILL.

1,245,462.  Specification of Letters Patent.  Patented Nov. 6, 1917.

Application filed March 22, 1917. Serial No. 156,597.

*To all whom it may concern:*

Be it known that I, HOWARD R. HUGHES, a citizen of the United States, residing at Houston, Harris county, Texas, have invented a certain new and useful Improvement in Rotary Boring-Drills, of which the following is a full, clear, and exact description, such as will enable others skilled in the art to which it appertains to make and use the same.

My invention relates to rotary boring drills of the type used in drilling oil, water or gas wells and mines. More especially it relates to drill heads of the disk type used in boring in earth, clay, soft rock, shale and gumbo.

The portions of the cutters on rotary drills which are subjected to the greatest wear are the portions of the cutters which act on the outer edge of the bottom of the hole adjacent the side wall of a hole. When these portions of the cutters wear away, the drill loses its clearance; or, in other words, fails to make a hole of the required diameter. It is then necessary to ream out the hole or increase the diameter of the same so as to bring the hole back to gage.

An object of my invention is to provide a rotary cutter boring drill which comprises means separate and distinct from the main cutters of the drill for maintaining the clearance of the drill head so as to prevent the diameter of the hole from becoming gradually less, or diminishing when the main cutters wear away, said means being permanently combined with the drill head so that it forms as essential a part of the drill as the cutters thereof.

Another object of my invention is to provide a drill head or bit, of the type indicated, that is equipped with reaming rollers of novel construction for insuring a hole of uniform diameter in the drilling operation. Another object is to mount these reaming rollers in a novel manner by means of which a more efficient and economical application of the rollers to the reaming operation is obtained, and the rollers secured from accidental unmounting or displacement.

Another object is to provide a type of rotary boring drill that will be self-centering because of the semi-spherical shape of the bottom of the hole given to it by the drill and which has side rollers serving to help prevent canting or tipping of the drill head, thus insuring the formation of a straight hole of approximately uniform diameter.

Another object is to provide a serviceable drill and reamer that comprises only a few rugged parts which are strong and rigid enough to withstand the strains to which they are subjected when the reamer is used in hard formations.

In the use of this type of drill it is customary to pump a strong downward discharge of water through the center of the drill stem on to the earth and other material being disintegrated. This serves to carry away the muck in an upward current outside the drill stem to the surface of the earth.

My invention contemplates an elongated drill head or bit for drilling oil or gas wells and in mining, said drill head being provided with cutting disks at the lower end, and reaming cutters on each side midway between the ends of the head. The head is somewhat flattened on two sides in the preferred embodiment illustrated in the drawing to allow a freer upward movement of the disintegrated material. The reaming rollers are arranged on the rounded sides of the head so as to bear against the sides of the well and serve by their cutting action to keep the hole of uniform diameter throughout, thus preventing any wedging or jamming of the bit or head in the hole.

Figure 1 is a top plan view of my improved drill head;

Fig. 2 is a side view thereof with one side in section on the line 2—2 of Fig. 3 and also showing the position of the reaming rollers with reference to the side of the drill hole;

Fig. 3 is a side view at right angles to the position shown in Fig. 2; and Fig. 4 is a bottom plan view partly in section on a line 4—4 of Fig. 2.

The drawing illustrates the preferred form of the invention, and in it like characters refer to like parts throughout the different figures. The bit is of the type called the split-head disk roller bit, and is made up of two main parts—A and B—with their interior faces flattened along an irregular plane, 17 (Figs. 1 and 4), so that the two parts will fit exactly together, and interlock in such manner as to prevent possibility of movement laterally of the two parts away from each other, as may be plainly seen from the figure.

The drill head, as stated, is equipped with two vertically disposed toothed cutting disks, arranged in a pocket or recess at the lower end of the drill head. The teeth on the said disks are omitted in Fig. 4 for purposes of clearness. There is a downwardly projected portion, 1, on each of the parts, A and B, furnishing bearings or supports for the opposite ends of a horizontally disposed shaft, C, on which the two disk shaped cutters, D, are rotatably mounted, said cutters being spaced from each other as clearly shown in Figs. 2 and 4. The shaft, C, is preferably formed in a single piece and is offset slightly in a horizontal plane, that is, it is provided with two bearing portions, as shown in Fig. 4, which lie in the same horizontal plane, but in different vertical places so that cutters, D, will be off-set or staggered slightly with relation to each other. This spindle or shaft is provided intermediate its ends with a collar, 2, for service as a spacing device, and side thrust bearing for the cutters. The disk-shaped cutters are frusto-conical in shape and provided with hard cutting teeth which are adapted to bear against the sides and bottom of the hole being drilled and cut the same away. The purpose for offsetting the cutters is to provide for a clearance behind each cutter so that the rear edge of said cutter will have sufficient space to provide against catching on the walls of the well and against jamming up with the loosened fragments of rock and earth.

It has been found that the cutting disks will wear down greatly when working in hard material, and that the hole, as a result, will grow somewhat smaller in diameter as the disks wear down, with a consequent wedging of the head. To avoid this undesirable consequence cutting or reaming rollers, E, are arranged in the rounded sides of the head and positioned at points corresponding to the ends of the longest diameter of the same. Pockets, 3, are set in the head at the points just indicated to accommodate the reaming rollers. These rollers are nearly cylindrical in shape, but are enlarged somewhat on a circumference midway between their ends from which line the diameter of the rollers decreases slightly toward each end. This provides a barrel-shaped roller, especially adapted for the purpose. Each reaming roller is toothed on its outer surface, as at 9, and provided with a central longitudinal bore or bearing. Each roller is mounted to rotate on a spindle, 5, which is inclined somewhat from the line of the longitudinal axis of the head so that the upper end of the roller tips outwardly. Each roller is provided with a bushing fitting within the central longitudinal bore thereof, as shown. A spindle, 5, fits in a cylindrical hole or recess, 4, longitudinally of the pocket 3. Said spindle has its lower end reduced somewhat, as at 6, and is threaded to screw into a recess in the head, also threaded to receive it.

In assembling these reaming rollers, the roller is set in the pocket with its axis inclined, as indicated, and a non-friction spacing washer is placed at its upper end. A spindle, 5, is then fitted into the hole, or recess, 4, and passed through the said washer and the central bore of the roller, and the threaded end, 6, of the spindle screwed tightly into place.

It has been shown by former extended experiment with reaming tools that unless special provision is made to prevent the bearing spindle from becoming loose under the constant shock and agitation to which it is subjected, the said spindle will cause trouble, and consequent loss of time by working out. Especially is this true where, as in some tools formerly used, the pin, or spindle, is inserted from below. To provide against such accidental loosening of the spindle after it has been properly adjusted, I provide a circular groove, 7, on the periphery of the spindle near the head thereof. To one side of the axis of the hole, 4, and adapted to co-act with the groove in the spindle, I arrange a set-screw which passes through a hole provided for it in the top of the head. When the said set screw is tightened down, it fits closely within the groove, 7, of the spindle, and effectively prevents longitudinal movement thereof, as may be clearly seen.

It will now be noted that the reaming rollers, when thus arranged, are housed in a pocket or recess which incloses the same on all sides, except the portion which projects outwardly for cutting action. This is a feature found to be of great value and effectively prevents the material, disintegrated in the drilling operation, from wedging behind the rollers and either clogging their action or causing the rollers to cease to rotate entirely, thereby inducing excessive wear on one side of the roller. The edge portions of the pocket serve also to scrape off the accumulation of clay or gumbo tending to cause clogging of the rollers.

I have provided the special type of reaming roller, hereinbefore described, and have mounted the same adjustably on an inclined axis in order to obtain several marked advantages over the old type of reamer, as will now more clearly appear.

It will be noted that with my special form of reaming roller set on an axis inclined outwardly at the upper end, the lower half of the roller presents a cutting surface on an incline inwardly from the vertical walls of the well, shown at 18. And when the drilling disks, D, begin to wear away, and the well to become too small, the inclined surface serves to progressively increase the diameter of the same to the required uniform size. The upper half of the reaming roller presents a vertical face to the side of the well, serving to steady the bit and keep the same from wabbling. Very little wear, however, is incurred by the upper half of the roller. The removability of the reaming rollers makes it possible, when the lower half of the same becomes worn, to take the roller out and reverse the same, end for end, and thus present a practically unworn and sharp cutting edge for the reaming operation. This materially increases the time before the lapse of which the roller will have to be resharpened.

The upper end of the split head is reduced in diameter and is threaded, as at 10, for attachment to the main drill stem, not shown. The threads on the reduced portion, 10, of the head, are arranged so that when the two parts which compose the head are fitted together in assembled position the threads will register in such manner as to constitute one continuous thread there around. The two portions are thus locked securely when they are screwed into the collar of the drill stem.

The upper portion of the part, 10, is provided with a still further reduced portion or nipple, 11, also threaded to receive a lubricant container, not shown. Extending downwardly from this nipple are lubricatting ducts, 14, one in each of the parts, A and B, of the head, for conveying lubricating fluid through branching ducts, 15 and 16, to the bearings to be lubricated.

This drill head is adapted to work in the usual manner adopted where rotary boring drills are used. The head is rotated in the direction of the arrow in Fig. 4. The cutting edges of the two rotary disks, D, cut into and disintegrate the bottom and sides of the hole. The detritus thus loosened is forcibly mixed with water pumped down under pressure from the surface through the hollow drill stem and the water distributing ducts, 13, of the head. This water mixed with the disintegrated material is carried back up to the surface, past the drill head, and through the space provided outside the drill stem. The present structure of reaming roller is especially adapted for this type of flat headed disk roller bit. The rollers serve the double purpose of cutting or reaming the hole and of steadying the movement of the drill, as is necessary to the proper operation of the disk bit, which is especially liable to wabble and cause a canting of the drill stem. This is prevented under the steadying influence of the special type of roller invented by me. Further, as there is comparatively little wearing action on the vertical or steadying portion of the rollers, they may be reversed, end for end, without any decrease in the rolling action, but with an increase in the effectiveness of the newly presented cutting surface. Furthermore, in this type of elongated head, found necessary in the disk type of drill, difficulty would be experienced in mounting the rollers if it were not for the inclined position of the bearing spindle. All this combination of parts herein shown and described unite to form a drill and reamer very efficient in operation, and novel in structure.

While I have shown and described the preferred embodiment of my invention, I wish it understood that there may be changes in the precise embodiment of the invention herein disclosed which may be made within the scope of what is claimed, and that I do not limit myself to the exact details herein shown and described but include all such changes and modifications as may fall within the scope of the appended claims.

What I claim is:

1. In a rotary boring drill comprising an elongated head, cutting means mounted on the lower end thereof and adapted to cut a cylindrical hole, reaming rollers arranged on the sides of the head and spaced above the cutting means, each of said rollers being reversible and shaped to taper slightly from its middle circumference toward each end so as to present a progressively enlarged cutting surface for the reaming operation on the sides of the hole.

2. In a rotary boring drill comprising an elongated head, cutting means mounted on the lower end thereof adapted to cut a cylindrical hole, reaming rollers arranged on the opposite sides of the head and spaced above the cutting means, said rollers mounted on axes inclined from the longitudinal axis of said head and reversible on their axes, end for end, said rollers serving to steady the action of the head, and presenting a new grinding surface when reversed.

3. A rotary boring drill comprising an elongated head, cutting means mounted on the lower end thereof adapted to cut a cylindrical hole, reaming rollers mounted on the opposite sides of the head and spaced above the cutting means, each of said rollers shaped to taper slightly from its middle circumference toward each end and reversible on its axis of rotation, end for end, serving to present in either position both a cutting and a rolling surface in the drilling operation.

4. A rotary boring drill comprising an elongated head, cutting means on the lower end thereof and adapted to cut a cylindrical hole, reaming rollers arranged on opposite sides of the head and spaced above the cutting means, each of said rollers constructed of one integral piece and mounted on an axis inclined upwardly away from the longitudinal axis of the head and shaped to taper slightly from its middle circumference toward each end so as to present a progressively enlarged cutting surface for the reaming operation, and a vertical rolling surface to steady the drill.

5. In a rotary boring drill comprising an elongated head, cutting means on the lower end thereof and adapted to cut a cylindrical hole, reaming rollers arranged on opposite sides of the head and spaced above the cutting means, each roller removably mounted on an axis inclined upwardly away from the longitudinal axis of the head and adapted to be reversible on its axis, end for end, and each of said rollers shaped to taper slightly from its middle circumference toward each end to present a progressively enlarged cutting surface for the reaming operation and a vertical rolling surface to steady the operation of the drill.

6. A rotary boring drill comprising an elongated head flattened somewhat on two sides and rounded on the other two, barrel-shaped reaming rollers having two equal grinding surfaces mounted in the rounded sides of the head in sockets so formed as to closely surround the rollers on all sides, except the outer cutting side and serving to steady the action of the drill, the axes of the rollers being inclined from the longitudinal axis of the head.

7. A rotary boring drill comprising an elongated head flattened somewhat on two sides and rounded on the other two, symmetrical reaming rollers reversibly mounted in the rounded sides of the head in sockets so formed as to closely surround the rollers on all sides, except the outer cutting side, the axes of the rollers being inclined outwardly at the top away from the longitudinal axis of the head, each of the rollers presenting a cutting surface and a rolling, steadying surface to the walls of the drill hole.

8. A rotary drill head, cutting means on the lower end thereof, reversible barrel shaped reaming rollers having two equal grinding surfaces rotatably mounted in sockets in the sides thereof, removable inclined spindles forming the axes of said rollers.

9. In a rotary boring drill for wells with cutting means at the lower end thereof, symmetrical reaming rollers arranged on opposite sides of the head, approximately midway of the head, means for mounting the rollers whereby they may be reversed, end for end, said rollers being adapted to present in either position an inclined cutting edge and a vertical rolling edge to the material being drilled.

10. In a rotary boring drill for wells with cutting means on the lower end thereof, barrel-shaped reaming rollers arranged on opposite sides of the head, approximately midway of the head, said rollers being mounted on axes inclined from the longitudinal axis of the head, means for mounting said rollers whereby they may be reversed, end for end, said rollers being adapted to present in either position an inclined cutting edge and a vertical rolling edge to the material being drilled.

11. In a rotary drill bit, a head, reversible reaming and steadying rollers arranged in the sides thereof, presenting, when reversed, a new cutting and grinding face for the reaming operation, said rollers being mounted on axes inclined from the longitudinal axis of the head.

12. In a rotary drill bit, a head, reaming and steadying rollers arranged in the sides thereof, said rollers being reversible to present a new cutting and grinding face in each position and mounted on axes inclined from the longitudinal axis of the head.

13. In a rotary drill bit, a head, reaming and steadying rollers, arranged in the sides thereof, said rollers being barrel-shaped and reversible to present a new cutting and grinding face and mounted on axes inclined upwardly and outwardly away from the longitudinal line of the head.

14. In a rotary drill bit for wells, a head, side rollers having two equal cutting surfaces and mounted in sockets in the sides thereof, said rollers being removable and reversible, end for end, and presenting a new grinding surface when reversed.

15. In a rotary drill bit for wells, a head, side rollers mounted in sockets in the sides thereof, said rollers having two equal cutting surfaces and reversible, end for end, and presenting in either position, both an inclined cutting surface and a vertical rolling surface to the sides of the well.

In testimony whereof, I have hereunto set my hand at Houston, Texas, this 19th day of March, 1917.

HOWARD R. HUGHES.

In presence of—
    JESSE R. STONE,
    C. S. POWERS.